(12) United States Patent
Perry et al.

(10) Patent No.: US 7,118,287 B2
(45) Date of Patent: Oct. 10, 2006

(54) FIBER OPTIC COUPLER WITH IN-LINE OPTICAL COMPONENT

(75) Inventors: Alexander S. Perry, Columbia, MD (US); George M. Murray, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/030,442

(22) PCT Filed: Jul. 10, 2001

(86) PCT No.: PCT/US01/21740

§ 371 (c)(1),
(2), (4) Date: Jan. 8, 2002

(87) PCT Pub. No.: WO02/08805

PCT Pub. Date: Jan. 31, 2002

(65) Prior Publication Data

US 2003/0007739 A1 Jan. 9, 2003

Related U.S. Application Data

(60) Provisional application No. 60/219,398, filed on Jul. 19, 2000.

(51) Int. Cl.
*G02B 6/38* (2006.01)

(52) U.S. Cl. ...................................................... 385/60
(58) Field of Classification Search .................. 385/60, 385/66, 73, 74, 76, 77, 78, 84, 137, 139
See application file for complete search history.

(56) References Cited

U.S. PATENT DOCUMENTS

| 3,910,678 | A | * | 10/1975 | McCartney et al. .......... 385/58 |
|---|---|---|---|---|
| 4,215,937 | A | * | 8/1980 | Borsuk ....................... 356/73.1 |
| 4,411,491 | A | * | 10/1983 | Larkin et al. ................. 385/73 |
| 4,487,474 | A | | 12/1984 | Nishie et al. |
| 4,711,517 | A | | 12/1987 | Fentress et al. |
| 4,717,234 | A | * | 1/1988 | Barlow et al. .............. 385/140 |
| 4,889,406 | A | * | 12/1989 | Sezerman .................... 385/140 |
| 5,082,345 | A | * | 1/1992 | Cammons et al. ............ 385/60 |
| 5,113,462 | A | | 5/1992 | Clancy et al. |
| 5,675,683 | A | * | 10/1997 | Takahashi et al. ............ 385/78 |
| 5,710,626 | A | | 1/1998 | O'Rourke et al. |
| 5,862,273 | A | | 1/1999 | Pelletier |

* cited by examiner

*Primary Examiner*—Lynn Feild
*Assistant Examiner*—Thanh-Tam Le
(74) *Attorney, Agent, or Firm*—Albert J. Fasulo, II (57) ABSTRACT

A coupler for coupling first and second fiber optic cables terminating in first and second connectors having first and second ferrules, respectively. The coupler includes a holder element and a mating element. The holder element defines a channel for receiving the first ferrule and a socket aligned with the channel for receiving an optical component The holder element further defines a first cable connector adapted for connection to the first connector and a first element connector opposite said first cable connector. The mating element defines a channel for receiving the second ferrule, a second cable connector adapted for connection to the second connector and a second element connector opposite the second cable connector. Accordingly, the holder element and mating element are connectable to house an optical component aligned with the channels and positionable substantially contiguous with the first and second ferrules when attached thereto.

27 Claims, 7 Drawing Sheets

FIBER OPTIC COUPLER WITH IN-LINE OPTICAL COMPONENT

CROSS-REFERENCE TO RELATED APPLICATIONS

This application claims the benefit of prior filed co-pending U.S. Provisional application No. 60/219,398, filed on Jul. 19, 2000, the disclosure of which is hereby incorporated herein by reference.

BACKGROUND OF THE INVENTION

1. Field of the Invention

The present invention relates generally to fiber optic couplers and particularly to a fiber optic coupler with an in-line optical component.

2. Description of the Related Art

In the field of fiber optics, it is often necessary to operate on an optical beam carried by an optical fiber using an optical component. For example, such optical components may include filters, such as colored glass, interference or neutral density filters, e.g. for blocking out or passing specific wavelengths of light, attenuators for reducing optical power to a desired range, polarizers for controlling the polarization of light, and isolators for preventing back reflections and other noise from reaching sensitive optical components. Such optical components are well known in the art.

A variety of "bench top" devices are known for use in a laboratory to set up optical components and fiber optic cables to allow access to and operation upon an optical beam. For example, Thor Labs of Newton, N.J., USA and Ocean Optics, Inc. of Dunedin, Fla., USA offer typical devices. These devices are adapted to position and hold a pair of fiber optic cables (and therefore fibers) in alignment at a specified distance from each other, e.g., approximately 1 to 2 inches. These devices include a structure permitting an optical component to be positioned therebetween to perform the desired operation on the optical beam after it exits the first fiber/cable and before it enters the second fiber/cable.

It will be appreciated that optical fibers provide for complete internal reflection of light and therefore there is little dissipation of light as it propagates along a continuous fiber. Where light dissipation will typically occur is at any interface between two mediums having different refractive indices, e.g. at a fiber/air interface, such as at the end of a single fiber or between two fibers held by a bench top device. Accordingly, as soon as the light leaves the first fiber and travels through the open air, the light begins to dissipate and/or diverge. This effect is significant even over the relatively short distance between the fibers when mounted in such bench top devices. Accordingly, each bench top device requires a pair of collimation lenses to focus the dissipating/diverging beam of light. In a bench top device, one such lens is positioned between each fiber and the optical component. These lenses are relatively expensive, typically costing hundreds of dollars and being the most expensive components in the bench top device.

There is a current trend toward the use of fiber optics in various pieces of equipment, and towards miniaturization of such equipment, e.g. to develop handheld devices. Such bench top devices are sufficiently large in size, e.g., approximately three inches by six inches by two inches, to be unsuitable for use in typical hand-held devices. The optical component is typically relatively large, e.g., greater than one-half inch square or approximately one inch round to account for inaccuracies in positioning of the fibers and/or optical component, and to facilitate handling. Such an arrangement is wasteful of optical component materials and contributes unnecessarily to the cost of the device.

Additionally, bench top devices require a high degree of precision in alignment of the fibers and optical component, and are therefore subject to a risk of misalignment due to jarring, etc. Some such devices have adjustments to permit realignment, but any realignment process requires an undesirable amount of work and time.

While some couplers with in-line optical components are known in the art, such couplers lack sufficient versatility to permit easy interchangeability of optical components and/or to allow for interchangeability of optical components of various thicknesses, particularly for connectors unlike the ST and FC connectors, which have floating, spring-biased designs and therefore have a degree of built-in versatility. Unlike telecommunications applications, which primarily involve long-term use of a pre-selected optical component in a given coupler, in spectroscopic applications, optical components must often be interchanged for a given coupler, e.g. when using a different sensor to perform a different analysis, or when analyzing a next, different substance.

What is needed is a compact, lens-free fiber optic coupler that provides for secure alignment of fibers, conservation of optical component materials, easy interchangeability of optical components, e.g. without the need for supplemental support structures such as bushings, sleeves or rings, and accommodation of interchangeable optical components of various thicknesses, and therefore various types.

SUMMARY OF THE INVENTION

The present invention provides such a fiber optic coupler. In particular, the present invention provides a coupler for coupling a first fiber optic cable terminating in a first connector having a first ferrule to a second fiber optic cable terminating in a second connector having a second ferrule. The coupler includes a holder element and a mating element. The holder element defines a channel for receiving the first ferrule and a socket aligned with the channel for receiving an optical component. The holder element further defines a first cable connector adapted for connection to the first connector and a first element connector opposite said first cable connector. The mating element defines a channel for receiving the second ferrule, a second cable connector adapted for connection to the second connector and a second element connector opposite the second cable connector.

Accordingly, the holder element and mating element are connectable, with an optical component disposed within a coupler body defined cooperatively by the holder and mating elements, the optical component being aligned with the channels and positionable substantially contiguous with the first and second ferrules when attached thereto. The holder element and mating element are also readily disconnectable to allow for an easy exchange of optical components. The coupler eliminates the need for collimating lenses required by bench top devices and is compact, e.g. less than approximately one inch by one-half inch by one-half inch. In this manner, optical component materials may be conserved by fabricating them to fit within these relatively small dimensions.

The holder and mating elements are connectable in a manner permitting adjustment of the size of an internal chamber for holding an optical component, e.g by adjusting the extent to which one element is threaded onto the other. This allows the coupler to accommodate optical components of various thicknesses, regardless of whether the fiber optic connector is adapted to connect to fiber optic connectors having a floating, spring-biased design.

A kit including at least one coupler and a plurality of optical components is also provided. The kit may also include additional couplers for accommodating the optical elements, e.g. to connect to various types of fiber optic connectors. Optionally, the holder elements and mating elements may be configured such that every holder element is connectable to every mating element, so that a coupler may be assembled to act as an adapter for coupling a first fiber optic cable, having a first type of connector, to a second fiber optic cable, having a second type of connector.

DESCRIPTION OF THE PREFERRED EMBODIMENT(S)

The present invention provides a fiber optic coupler with in-line optical component. The coupler may be used for coupling a first fiber optic cable terminating in a first connector to a second fiber optic cable terminating in a second connector. A fiber optic coupler in accordance with the present invention may be configured for use with fiber optic cable terminating in various types of connectors including, for example, SMA, FC, ST, LC, and SC, type connectors. These and other connectors are well known in the art and therefore there is no need to illustrate each of them herein. FIGS. 1–4 show an exemplary fiber optic coupler according to a first embodiment of the present invention for coupling SMA-type connectors.

Conceptually, the fiber optic coupler of the present invention is a compact, lens-free design that holds an optical element and allows for aligning and coupling of two fiber optic connectors with the optical component therebetween, leaving the optical fibers substantially contiguous with the optical component. This is typically best achieved by placing the ferrules of the connectors substantially contiguous with the optical component. As used herein, "substantially contiguous" means sufficiently close in proximity so as not to require a collimating or other lens to reduce dissipation and/or divergence to an acceptable level, and more particularly, in contact with, or as nearly in contact as the structure of the ferrule/connector will permit. It will be appreciated that a small gap, e.g. in the range of 50–150 microns, will not preclude an optical component and optical fiber or ferrule from being "substantially contiguous", but a smaller gap or no gap is more desirable, since such gaps allow dissipation/divergence of light, as discussed above. Additionally, the coupler is of a multi-piece design, the pieces being readily disconnectable to allow for an easy exchange of optical components. The holder and mating elements are adjustably connectable to adjust the length of an internal chamber for holding an optical component, e.g. by adjusting the extent to which one element is threaded onto the other. In this manner, the coupler can accommodate optical components of various thicknesses for any type of fiber optic connector/termination.

The exemplary fiber optic coupler shown in FIGS. 1–4 is a two-piece design, and therefore the coupler body includes only a holder element 10 and a mating element 40. An exemplary alternate three-piece design is discussed below with reference to FIGS. 5–7.

The holder element 10 and mating element 40 each have a first end 12, 42 including a cable connector 14, 44 for connecting to the desired fiber optic cable connector. In the exemplary holder element in FIGS. 1–4, both the holder element 10 and mating element 40 are configured with cable connectors 14, 44 having external threads 16, 46 for connecting to internally threaded fiber optic connectors, e.g. SMA or FC type connectors. However, the cable connectors 14, 44 may have other structures that do not include threads, as necessary for connecting to other types of connectors. For example, for an SC type connector, the cable connectors 14, 44 may be configured with a push-pull type plug, and for an ST type connector, the cable connectors 14, 44 may be configured with a quick-release bayonet coupling. Suitable cable connector structures for connecting to fiber optic connectors are well known in the art. Each cable connector may have any such structure.

Each coupler design referred to above may be configured for use as a simple coupler, i.e. to join two connectors of a single type (e.g. SMA) as shown in FIGS. 1–4. Alternatively, each coupler design may be configured for use as an adapter, i.e. to optically couple a fiber optic cable having a first type of connector, e.g. SMA, to a fiber optic cable having a second type of connector, e.g. SC. For example, the cable connector 14 of the holder element 10 could be configured with external threads to connect to an SMA connector, and the cable connector 44 of the mating element 40 could be configured with a push-pull type plug (not shown) to connect to an ST type connector.

Figure 1:
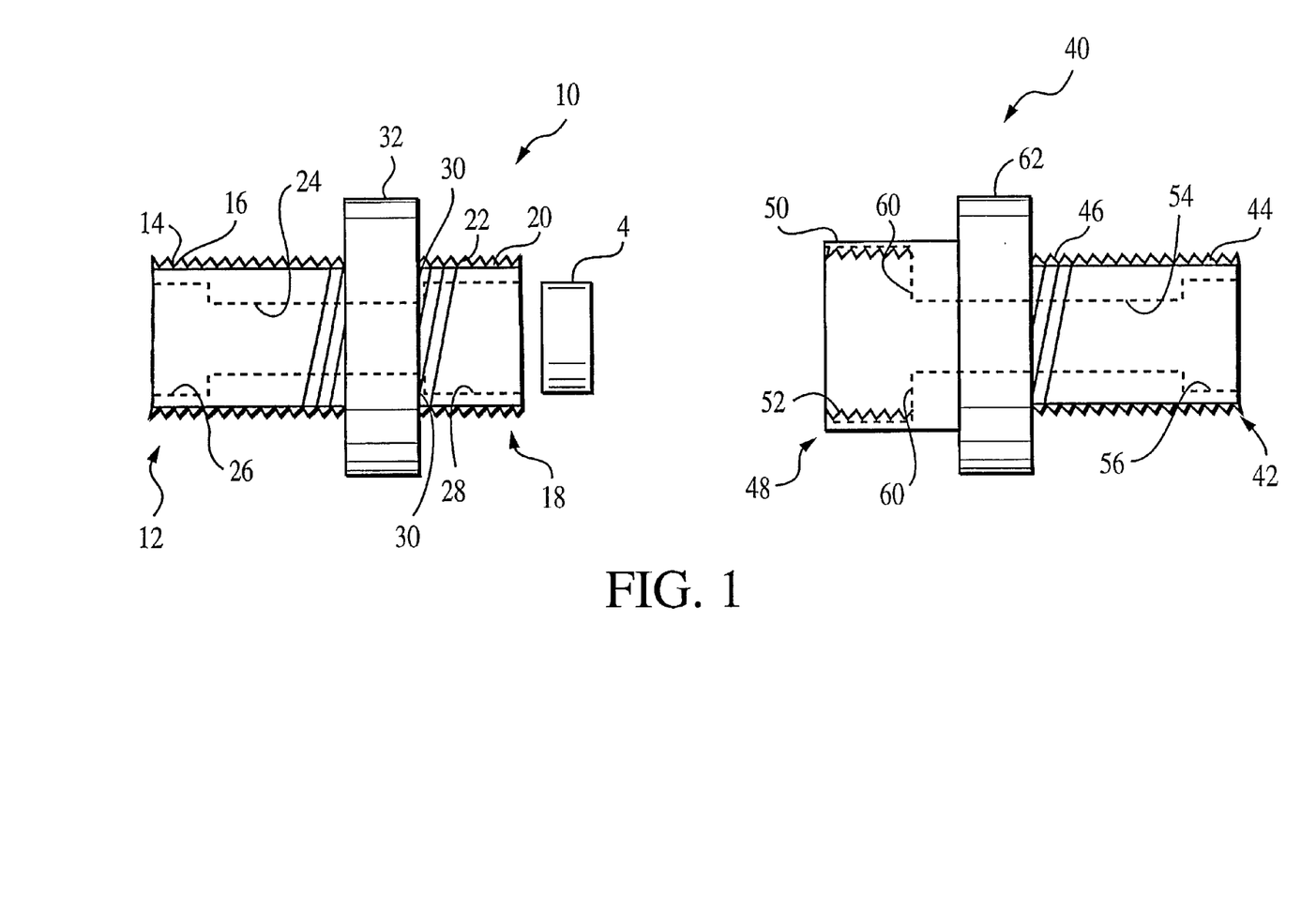
FIG. 1 is an exploded elevational view of an exemplary coupler in accordance with a first embodiment of the present invention.

The holder element 10 and mating element 40 each have a second end 18, 48 including an element connector 20, 50. The element connectors 20, 50 are complementary for attaching the holder element 10 to the mating element 40. The exemplary coupler of FIGS. 1–4 is of a threaded design, meaning that the holder element 10 and mating element 40 are may be mechanically coupled by threads to form the coupler body. In FIG. 1, the holder element 10 has external threads 22 and the mating element 40 has complementary internal threads 52. In an alternative embodiment, the holder element includes the internal threads and the mating element includes complementary external threads. Any other suitable coupling, including permanent and non-permanent methods and/or structures, may be used to couple the holder element 10 and mating element 40. A threaded design is advantageous because it is non-permanent in that it allows the holder element and mating element to be readily disassembled and reassembled, e.g. to replace or exchange an optical component as discussed further below, and because it allows for adjustment of the position of the holder element relative to the mating element to define internal chambers of various sizes and to thereby accommodate optical components of various thickness, as discussed further below.

The holder and mating elements 10, 40 each define a channel 24, 54 therethrough for receiving first and second ferrules of the fiber optic cable connectors to which the holder and mating elements 10, 40 are configured to be attached. The channels 24, 54 may have any structure suitable for mating with a corresponding ferrule of a corresponding connector. The channels 24, 54 are positioned to be in optical alignment when the holder element 10 and mating element 40 are coupled. In the exemplary holder element 10 and mating element 40 of FIGS. 1–4, the channels 24, 54 include notched portions 26, 56. In this manner, the holder element 10 and mating element 40 have structure suitable for coupling to a "stepped down" or "necked" ferrule of a 906-style SMA connector. Such structure is generally known in the art for standard couplers and/or adapters.

The holder element 10 includes a socket 28 generally aligned with the channel 24 so as to receive and position an optical component, e.g. 4, in the path of an optical beam carried by a fiber carried by a cable attachable to the holder element 10. Optionally, the socket 28 may have a cross-sectional area greater than a cross-sectional area of the channel adjacent the socket. In this manner, a portion 30 of an interior wall of the holder element 10 serves as a stop for receiving an optical element. Optionally, this surface 30 may also serve as a clamping surface for retaining the optical element, e.g. in embodiments in which the length of the channel is no less than the length of the ferrule of a corresponding connector. As shown in FIG. 1, the cross-sectional areas extend out of the plane of FIG. 1. For example, the socket 28 may be circular or rectangular in cross-section, or irregular or "keyed" in cross-section. The holder element 10 and mating element 40 are configured such that when connected, they form an internal chamber for retaining the optical component, as discussed further below.

In some embodiments, such as that shown in FIGS. 1–4, the element connectors 20, 50 of the holder and mating elements 10, 40 are configured to provide a longitudinally adjustable connector. In this manner, the holder and mating elements 10, 40 are adjustably connectable to define an internal chamber 66 of various lengths. Accordingly, the chamber may accommodate optical components 4 of various thicknesses, and therefore various optical components, including optical components of different types, may be interchangeably used with the coupler. This is desirable, for example, when a coupler and multiple optical components are included in a kit, as discussed further below. For example, the longitudinally adjustable connector may include complementary threads or a comparable design, such as a sliding sleeve design having a set-screw or locking clip to fix the relative positions of the sleeves. For example, the mating element 40 of FIGS. 1–4 may be threaded onto the holder element 10 to a lesser extent to define a longer chamber for accommodating a longer optical element, or to a greater extent to define a shorter chamber for accommodating a shorter optical element. Additionally, the longitudinally adjustable connector allows the chamber 66 to be adjusted in length while maintaining closure of the chamber 66 to reduce dissipation and/or escape of light. To that end, it may be preferable that the internal surfaces of the holder and mating elements 10, 40 are highly reflective, e.g. polished stainless steel or other metal, and/or that an external surface of the optical component 4 is highly reflective, e.g. having a reflective coating. In this manner, a significant portion of any light escaping the fiber(s) is reflected from the boundary back into the fiber(s).

Figure 2:
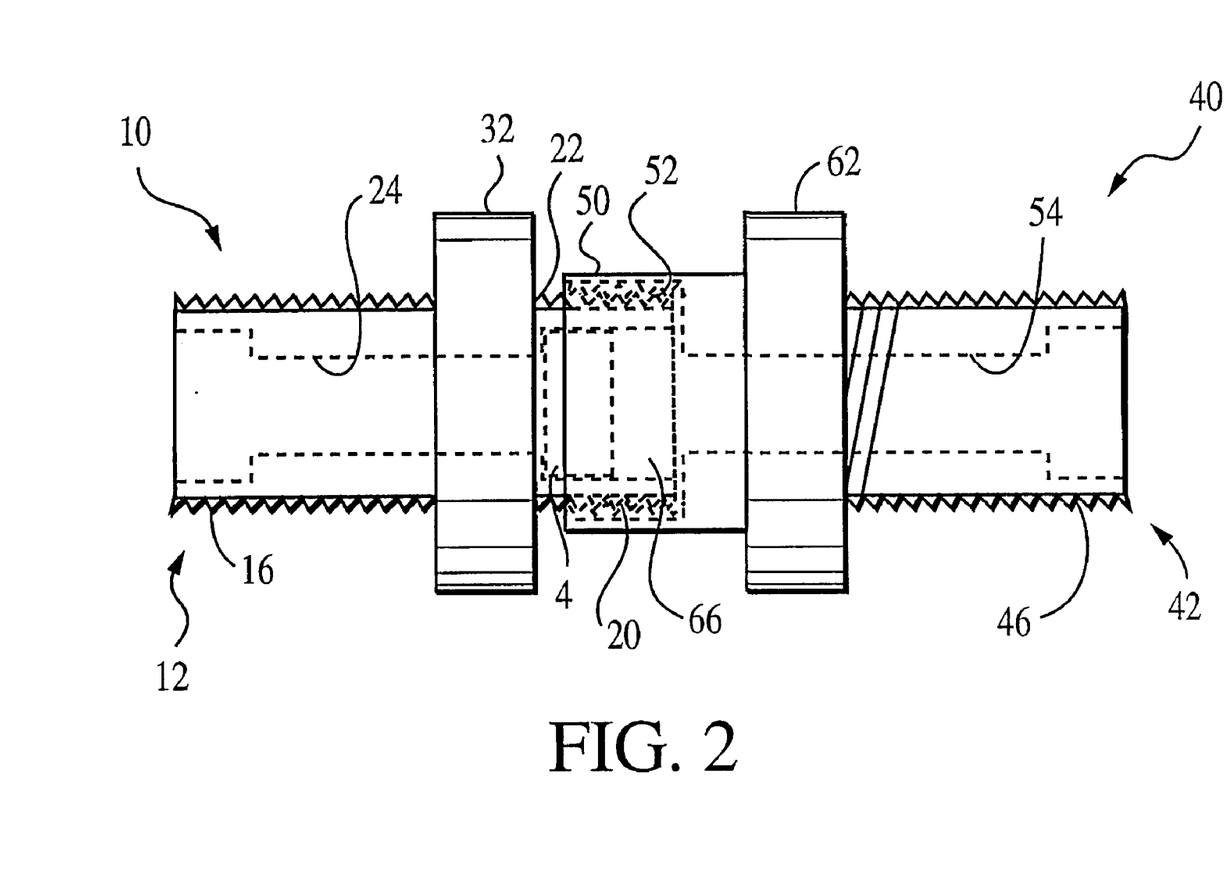
FIG. 2 is an elevational view of the coupler of FIG. 1 showing the coupler assembled and housing an optical component.
Figure 3:
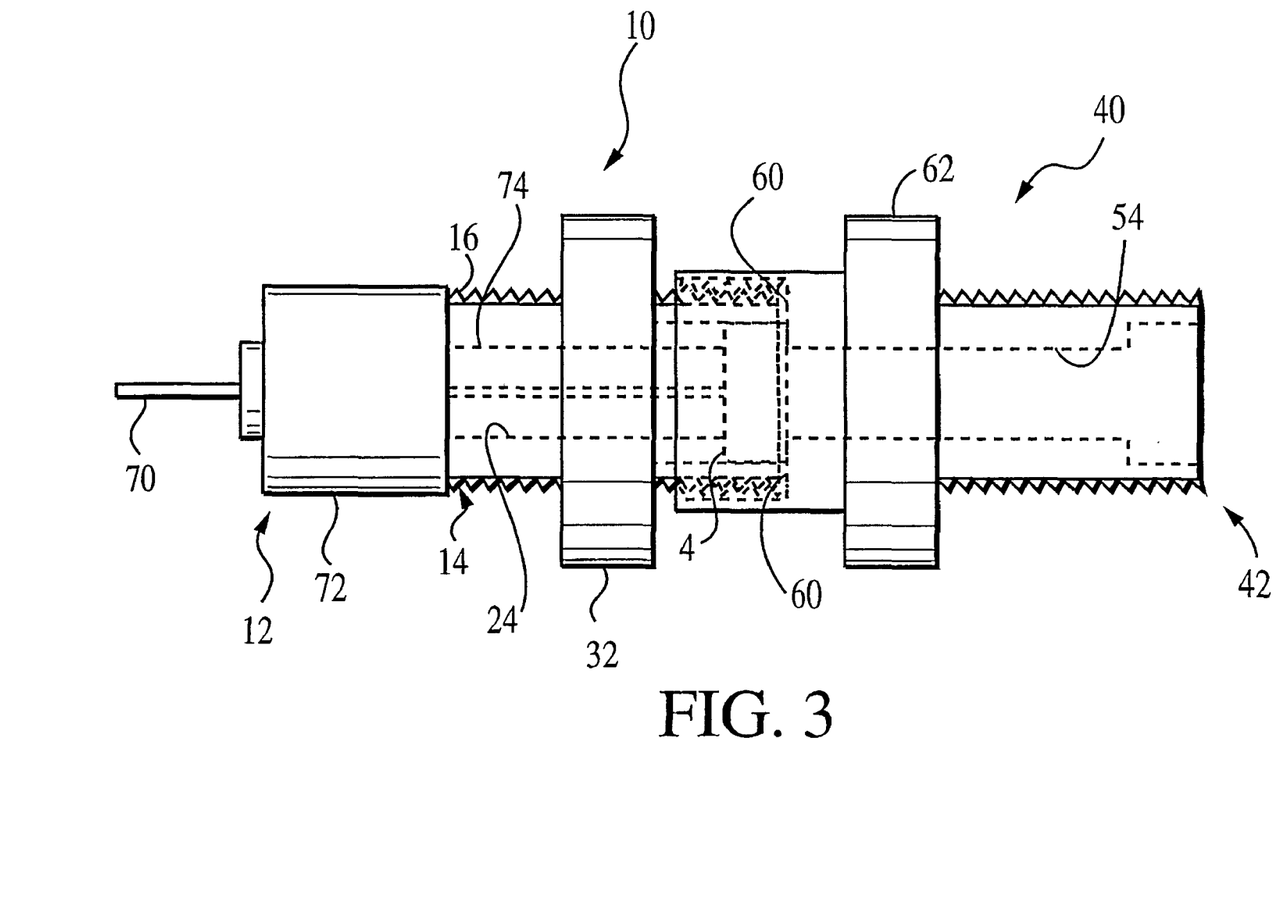
FIG. 3 is an elevational view of the assembled coupler of FIG. 2, showing an SMA connector attached to one end.

Optionally, as in FIGS. 1–4, the channel 24 of the holder element 10 is shorter in length than the ferrule of the connector to which the holder element 10 is adapted to connect. This causes the ferrule to extend into the socket 28 when coupled to the holder element 10 and to ensure contact with the optical component 4. In the exemplary coupler of FIGS. 1–4, the channel is sufficiently short to cause the optical component 4 to at least partially extend beyond the second end 18 of the holder element 10. Advantageously, this allows the holder and mating elements 10, 40 to accommodate a relatively broad range of thicknesses of optical components. Specifically, this allows the mating element 40, in cooperation with the first ferrule, to lock the optical component 4 in place when threaded onto the holder element 10, as shown in FIG. 3. To that end, the socket 28, or chamber as defined at least partially by the socket when the coupler body is assembled, may have a length greater than a thickness of the optical component and a substantially uniform cross-section along its length to permit sliding movement of an optical component 4 within the socket 28, as discussed further below. Accordingly, the channel 54 of the mating element 40 need not be shorter than the length of the ferrule of the second connector attachable to the mating element 40.

In another embodiment, both channels may be shorter than their respective ferrules such that the ferrules cooperate to lock the optical component 4 in place.

Optionally, the holder element 10 and/or the mating element 40 may include an enlarged cross-section grasping portion 32, 62 to facilitate grasping and/or tightening of the connectors. Such grasping portions are well known in the art, e.g. for known SMA and FC type connectors. For example, such portions 32, 62 may present a knurled, hexagonal or substantially rectangular outer surface.

In use, the coupler of FIGS. 1–4 is first disassembled, if necessary to separate the holder element 10 and mating element 40. An optical component 4, such as a colored glass filter, may then be inserted into the socket 28 of the holder element 10. The relatively deep socket 28 serves to securely hold the optical component in place.

FIG. 2 is an elevational view of the coupler of FIG. 1 showing the holder element 10 and mating element 40 assembled to form a coupler housing an optical component 4. Referring now to FIG. 2, the holder and mating elements 10, 40 are then connected by mating the element connectors 20, 50. For the exemplary coupler of FIGS. 1–4, this is achieved by threading the internal threads 52 of mating element 40 onto the external threads 22 of holder element 10 as shown in FIG. 2. For example, this may involve grasping and rotating the grasping portions 32, 62 of the holder element 10 and mating element 40.

In the embodiment shown in FIGS. 1–4, this causes the optical component 4 to be slideably retained within a chamber 66 formed by the socket 28 of the holder element 10 and an internal surface 60 of the mating element 40. Internal surfaces 30, 60 cooperate to prevent the optical component 4 from sliding out of the coupler when the coupler is not connected to two optical fiber connectors. In alternate embodiments, the socket may have a depth that prevents the optical component from sliding within the chamber 66.

Referring now to FIG. 3, a first fiber optic cable, i.e. fiber optic connector, may then be attached to the holder element 10. For the exemplary coupler of FIGS. 1–4, this involves threading the internal threads of SMA connector 72 onto the external threads 16 of the cable connector 14 of the holder element 10. This causes the ferrule 74 of the SMA connector 72 to enter the channel 24 of the holder element 10 and to become substantially contiguous with, e.g. to contact, the optical component 4. By adjusting the extent of advancement of the connector 72 onto the holder element 10 and/or the extent of advancement of the mating element 40 onto the holder element 10, it may be ensured that the ferrule 72 of the connector is substantially contiguous with the optical component 4. Preferably, the connector 72 will fully seat with the holder element 10, e.g. with the stepped up ferrule 74 nesting in the notched portion 26 and all necessary adjustment may be made between the holder element 10 and mating element 40. This promotes stability, security, and proper alignment of the connector 72 with the holder element 10.

In the exemplary coupler shown in FIGS. 1–4, this adjustment causes the optical component 4 to the rest against internal surfaces 60 of the mating element 40. In this manner, the optical component 4 is braced by the internal surfaces 60 of the mating element 40 and is clamped in place by cooperation of the ferrule 74 and the internal surfaces 60 of the mating element 40. In an alternate embodiment in which the ferrule 74 has a length that is not greater than the length of the channel 24, the optical connector may be clamped by internal surfaces 30, 60 of both the holder and mating elements 10, 40. It will be appreciated that the threaded element connectors 20, 50 of the holder and mating elements 10, 40 permit adjustment to provide such clamping of an optical component 4 having a relatively broad range of thicknesses, regardless of the type of fiber optic connector that may be connected to the coupler.

Figure 4:
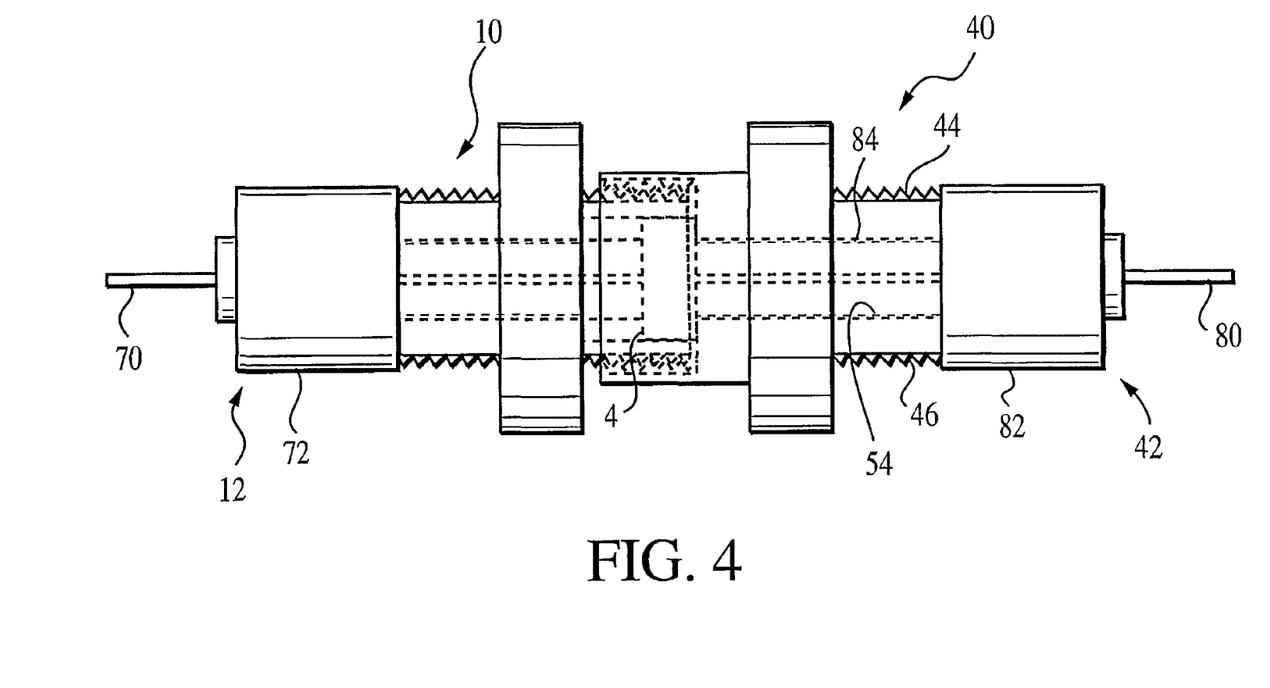
FIG. 4 is an elevational view of the assembled coupler of FIG. 2, showing an SMA connector attached to both ends.

Referring now to FIG. 4, a second fiber optic cable, e.g. SMA fiber optic connector 82 may then be attached to the mating element 40, e.g. by threading the internal threads of the SMA connector 82 onto the external threads 46 of the cable connector 44 of the mating element 40. This causes the ferrule 84 of the SMA connector 82 to enter the channel 54 of the mating element 40 and to become substantially contiguous with, e.g. to contact, the optical component 4. In the embodiment shown in FIGS. 1–4, this does not require adjustment of the extent of advancement of the mating element 40 onto the holder element 10 because the length of the channel 54 of the mating element 40 is identical the length of the ferrule 84.

In alternate embodiments, the channel 54 may be shorter in length, or longer in length, which would necessitate an adjustment of the extent of advancement of the mating element 40 onto the holder element 10.

In this manner, the holder element 10 and mating element 40 are connected to align and couple the first and second fiber optic cables 70, 80 with the optical component 4 positioned between the first and second ferrules 74, 84 and substantially contiguous therewith. Accordingly, a compact, securely aligned coupler is provided, suitable for use in handheld devices, which allows the optical component 4 to operate on an optical beam carried by the cables 70, 80, without the need for expensive lenses.

Figure 5:
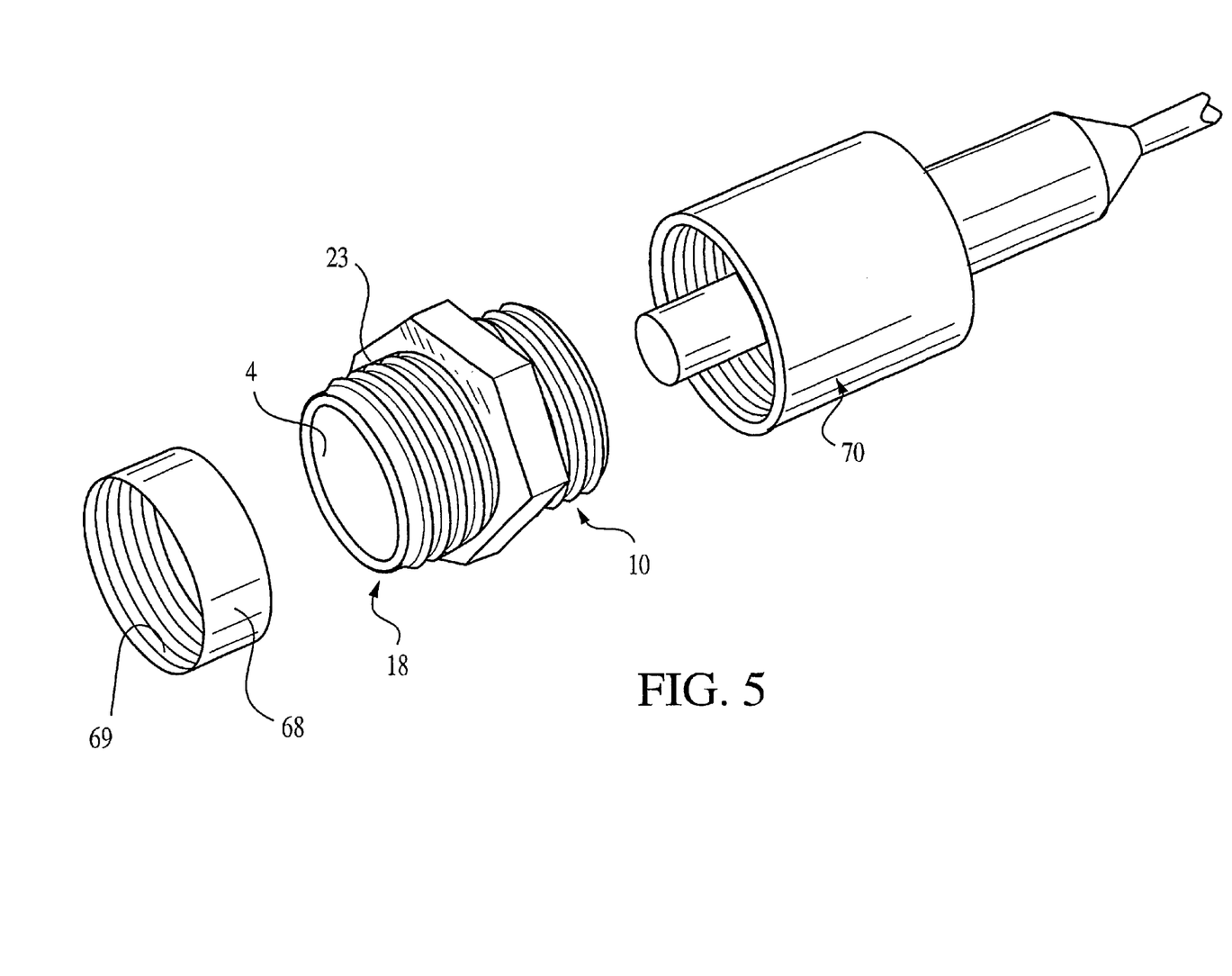
FIG. 5 is an exploded perspective view of an exemplary coupler in accordance with a second embodiment of the present invention.
Figure 6:
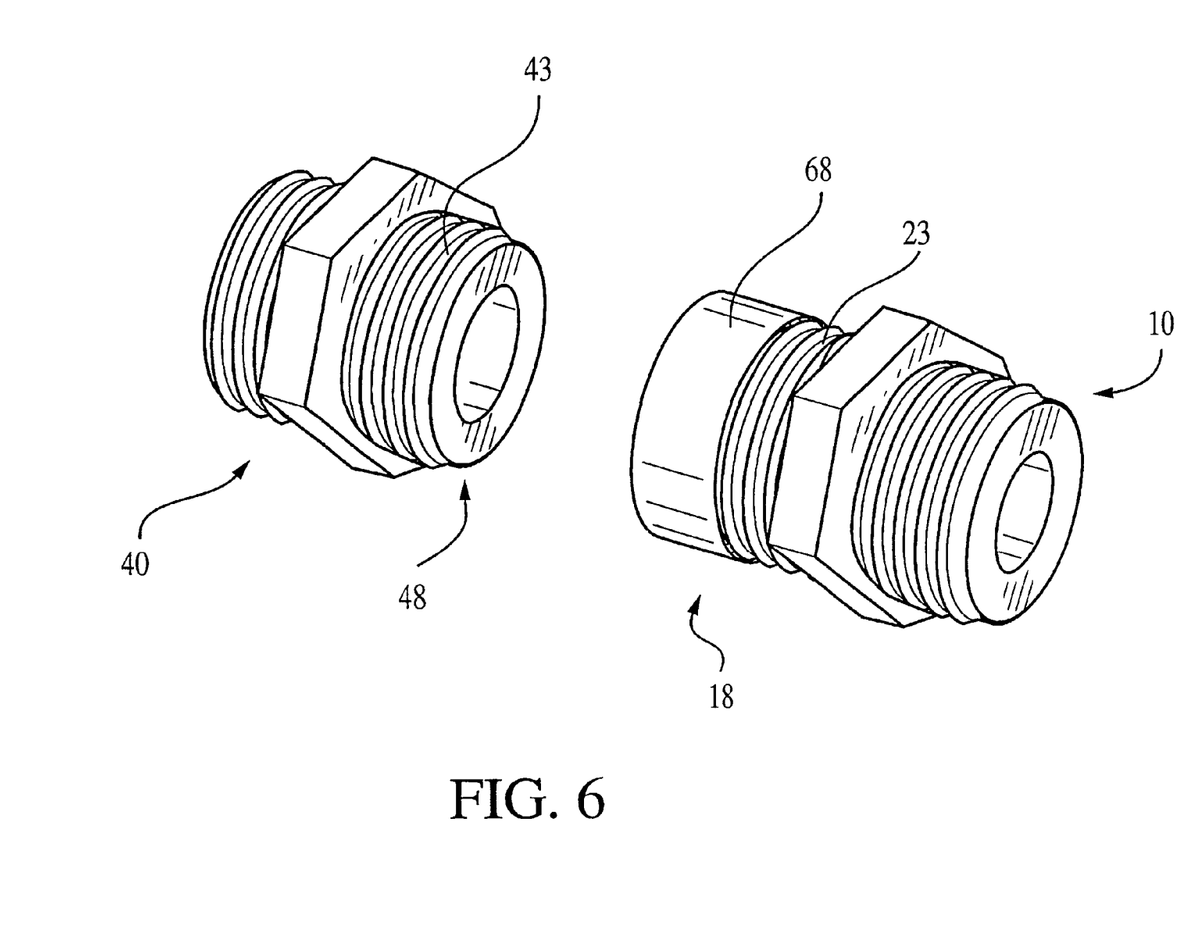
FIG. 6 is an exploded perspective view of a partially assembled coupler of FIG. 5.
Figure 7:
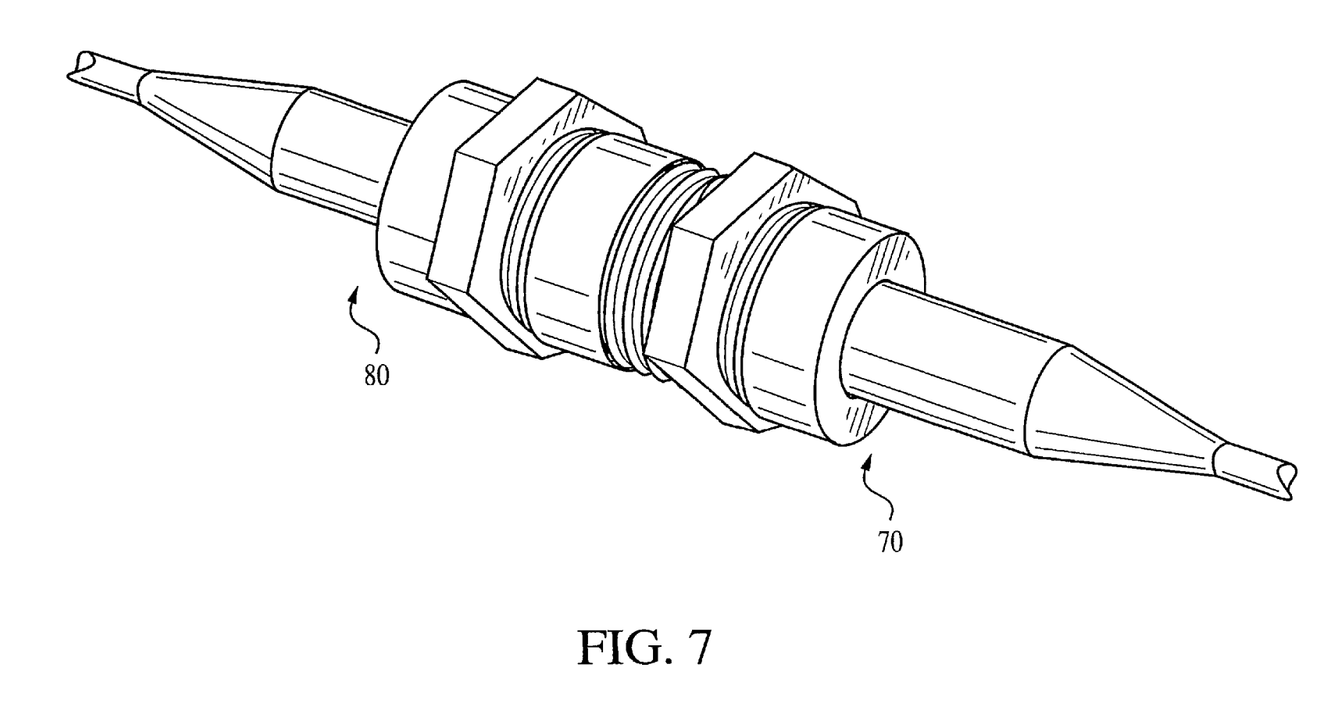
FIG. 7 is a perspective view of an assembled coupler of FIG. 5, showing an SMA connector attached to both ends.

An exemplary alternate three-piece design of the coupler is shown in FIGS. 5–7. For clarity, similar parts have been marked with identical reference numerals. The three-piece design includes a holder element 10 and a mating element 40 which are similarly configured with cable connectors and channels for connecting to fiber optic cables 70, 80. Unlike the two-piece design shown in FIGS. 1–4, the three-piece design further includes a joining element 68 for connecting the holder element 10 to the mating element 40. Accordingly, both the holder element 10 and the mating element 40 second ends 18, 48 are adapted for connection to the joining element 68. In the exemplary embodiment shown in FIGS. 5–7, the holder and mating elements 10, 40 are adapted with external threads 23, 43, and the joining element 68 includes complementary internal threads 69. Like the two-piece design, this design is advantageous because it allows for disassembly and interchangeability of optical components. This three-piece arrangement is advantageous because it may be created by modifying, in accordance with the present invention, a pair of known couplers (to form the holder and mating elements 10, 40), and by using existing common parts as a joining element 68, thereby achieving the novel coupler disclosed herein.

It will be appreciated that the coupler and optical components may be included in a kit for coupling fiber optic cables. The kit includes at least two optical components having a substantially identical cross-section and a two-piece or three-piece coupler as described above. In one embodiment, the kit includes a single coupler including a single holder element and single mating element. Such a kit may be configured for use with connectors of a single type, e.g. an SMA connector. In another embodiment, the kit further includes at least a second coupler for coupling connectors of a second type, e.g. an FC connector. Such a kit may be used for connectors of SMA and FC type. In another embodiment, the kit includes first and second couplers and the holder element of the first coupler is connectable to the mating element of the second coupler, and the second holder element of the second coupler is connectable to the mating element of the first coupler. In other words, all holder elements of the kit have element connectors that are similarly configured, all mating elements of the kit have element connectors that are similarly configured, and therefore every holder element of the kit is connectable to every mating element of the kit. In this manner, the kit may be used to make a variety of simple couplers and adapters, each of which is adjustable to fit any of the optical components included in the kit.

Having thus described particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A coupler for coupling a first fiber optic cable, terminating in a first connector having a first ferrule, to a second fiber optic cable, terminating in a second connector having a second ferrule, said coupler comprising:

a holder element defining a channel therethrough for receiving the first ferrule, and a socket aligned with said channel for receiving an optical component, said holder element further defining a first cable connector adapted for connection to the first connector and a first element connector opposite said first cable connector;

a mating element defining a channel therethrough for receiving the second ferrule, said mating element further defining a second cable connector adapted for connection to the second connector and a second element connector opposite said second cable connector; and an optical component positionable within said holder element; whereby said holder element and said mating element are connectable by said first and second element connectors to align and couple the first and second fiber optic cables with said optical component positioned between the first and second ferrules and substantially contiguous therewith when the first and second connectors are connected to said first and second cable connectors; and wherein said holder element and said mating element are connectable to define a chamber, intermediate said first and second cable connectors, for retaining said optical component therein; and wherein said chamber has a length greater than a thickness of said optical component.

2. The coupler of claim 1, wherein said chamber has a cross-sectional area greater than a cross-sectional area of said channel adjacent said chamber.

3. The coupler of claim 1, wherein said element connectors of said holder element and said mating element cooperate to form a longitudinally adjustable connector.

4. The coupler of claim 1, wherein said first and second element connectors of said holder element and said mating element are connected to define a coupler body housing said optical component.

5. The coupler of claim 3, wherein one of said element connectors comprises external threads and another of said element connectors comprises complementary internal threads.

6. The coupler of claim 4, wherein a portion of said channel defined by said holder element is shorter in length than the ferrule of the connector to which said holder element is adapted to connect.

7. The coupler of claim 1, wherein said cable connectors of said holder element and said mating element are adapted for connection to a first type of connector.

8. The coupler of claim 7, wherein said cable connectors comprise external threads for connection to the first and second connectors.

9. The coupler of claim 8, wherein a portion of said channel defined by said holder element is shorter in length than the ferrule of the connector to which said holder element is adapted to connect.

10. The coupler of claim 1, wherein said cable connector of said holder element is adapted for connection to a first type of connector, and wherein said cable connector of said holder is adapted for connection to a second type of connector.

11. The coupler of claim 1, further comprising a joining element for connecting said holder element to said mating element.

12. The coupler of claim 1, wherein said optical component comprises:

(i) a central portion being optically coupled between respective ends of said first and second ferrules when said holder element and said mating element are connected together; and (ii) a peripheral portion extending around the central portion and positioned adjacent a wall of the holder element defining the chamber when said holder element and said mating element are connected together.

13. The coupler of claim 12, wherein said optical element central portion has a cross-sectional area at least as large as a cross-sectional area of the holder element channel for receiving said first ferrule.

14. A coupler for coupling a first fiber optic cable terminating in a first connector having a first ferrule to a second fiber optic cable terminating in a second connector having a second ferrule, said coupler comprising:

a holder element defining a channel therethrough for receiving the first ferrule, and a socket aligned with said channel for receiving an optical component, said socket having a cross-sectional area greater than a cross-sectional area of said channel adjacent said socket, said holder element further defining a first cable connector adapted for connection to the first connector and a first element connector opposite said first cable connector; and a mating element defining a channel therethrough for receiving the second ferrule, said mating element further defining a second cable connector adapted for connection to the second connector and a second element connector opposite said second cable connector, said mating element defining a surface capable of at least partially closing said socket to define a chamber when said mating element is connected to said holder element;

whereby said holder element and said mating element are connectable by said first and second element connectors to align and couple the first and second fiber optic cables with an optical component positioned between the first and second ferrules and substantially contiguous therewith; and wherein said socket has a length greater than a thickness of said optical component.

15. The coupler of claim 14, wherein said holder element and said mating element are connectable by a joining element.

16. The coupler of claim 14, wherein said first and second element connectors are complementary for attachment to one another.

17. The coupler of claim 16, wherein one of said element connectors comprises external threads and another of said element connectors comprises complementary internal threads.

18. The coupler of claim 14, wherein said channel of said holder element is shorter in length than the ferrule of the connector to which said holder element is adapted to connect.

19. The coupler of claim 14, wherein said first and second cable connectors are adapted for connection to a first type of connector.

20. The coupler of claim 19, wherein said first and second cable connectors comprise external threads for connection to the first and second connectors.

21. The coupler of claim 20, wherein said channel of said holder element is shorter in length than the ferrule of the connector to which said holder element is adapted to connect.

22. The coupler of claim 14, wherein said first cable connector is adapted for connection to a first type of connector, and wherein said second cable connector is adapted for connection to a second type of connector.

23. A coupler for coupling a first fiber optic cable terminating in a first connector having a first ferrule to a second fiber optic cable terminating in a second connector having a second ferrule, said coupler comprising:

a holder element defining a channel therethrough for receiving the first ferrule, and a socket aligned with said channel for receiving an optical component, said holder element further defining a first cable connector adapted for connection to the first connector and a first element connector opposite said first cable connector, said first element connector comprising external threads; and a mating element defining a channel therethrough for receiving the second ferrule, said mating element further defining a clamping surface and a second cable connector adapted for connection to the second connector and a second element connector opposite said second cable connector, said second element connector comprising internal threads complementary to said external threads of said holder element;

whereby said first element connector is threadable onto said second element connector to align and couple the first and second fiber optic cables with an optical component positioned in contact with said clamping surface and between the first and second ferrules and substantially contiguous therewith;

wherein said holder element and said mating element are connectable to define a chamber, intermediate said first and second cable connectors, for retaining said at least one of said optical components therein; and wherein said chamber has a length greater than a thickness of said at least one of said optical components.

24. The coupler of claim 23, wherein said socket having a cross-sectional area greater than a cross-sectional area of said channel adjacent said socket.

25. A kit for coupling fiber optic cables terminating in first and second connectors having first and second ferrules, respectively, said kit comprising;

a plurality of optical components, each of said plurality of optical components having distinct optical characteristics, each of said plurality of optical components having a substantially identical cross-section; and a coupler for coupling first fiber optic cables terminating in first and second connectors, said coupler comprising;

a holder element defining a channel therethrough for receiving the first ferrule, and a socket aligned with said channel for receiving an optical component, said holder element further defining a first cable connector adapted for connection to the first connector and a first element connector opposite said first cable connector;

a mating element defining a channel therethrough for receiving the second ferrule, said mating element further defining a second cable connector adapted for connection to the second connector and a second element connector opposite said second cable connector;

whereby said holder element and said mating element are connectable by said first and second element connectors to align and couple said first and second fiber optic cables with at least one of said plurality or optical components positioned between said first and second ferrules and substantially contiguous therewith, each of said plurality of optical elements being interchangeably positionable within said coupler.

26. The kit of claim 25, wherein said cable connectors of said holder element and said mating element are adapted for connection to a first type of connectors, said kit further comprising:

a second coupler for coupling first fiber optic cables terminating in first and second connectors, said coupler comprising:
a second holder element defining a channel therethrough for receiving the first ferrule, and a socket aligned with said channel for receiving an optical component, said socket having a cross-sectional area greater than a cross-sectional area of said channel adjacent said socket, said holder element further defining a first cable connector adapted for connection to the first connector and a first element connector opposite said first cable connector; and
a second mating element defining a channel therethrough for receiving the second ferrule, said mating element further defining a second cable connector adapted for connection to the second connector and a second element connector opposite said second cable connector;

said second holder element and said second mating element being adapted for connection to a second type of connectors.

27. The kit of claim 25, wherein said holder element of said coupler is connectable to said second mating element of said second coupler, and wherein said second holder element of said second coupler is connectable to said mating element of said coupler.

* * * * *